UNITED STATES PATENT OFFICE.

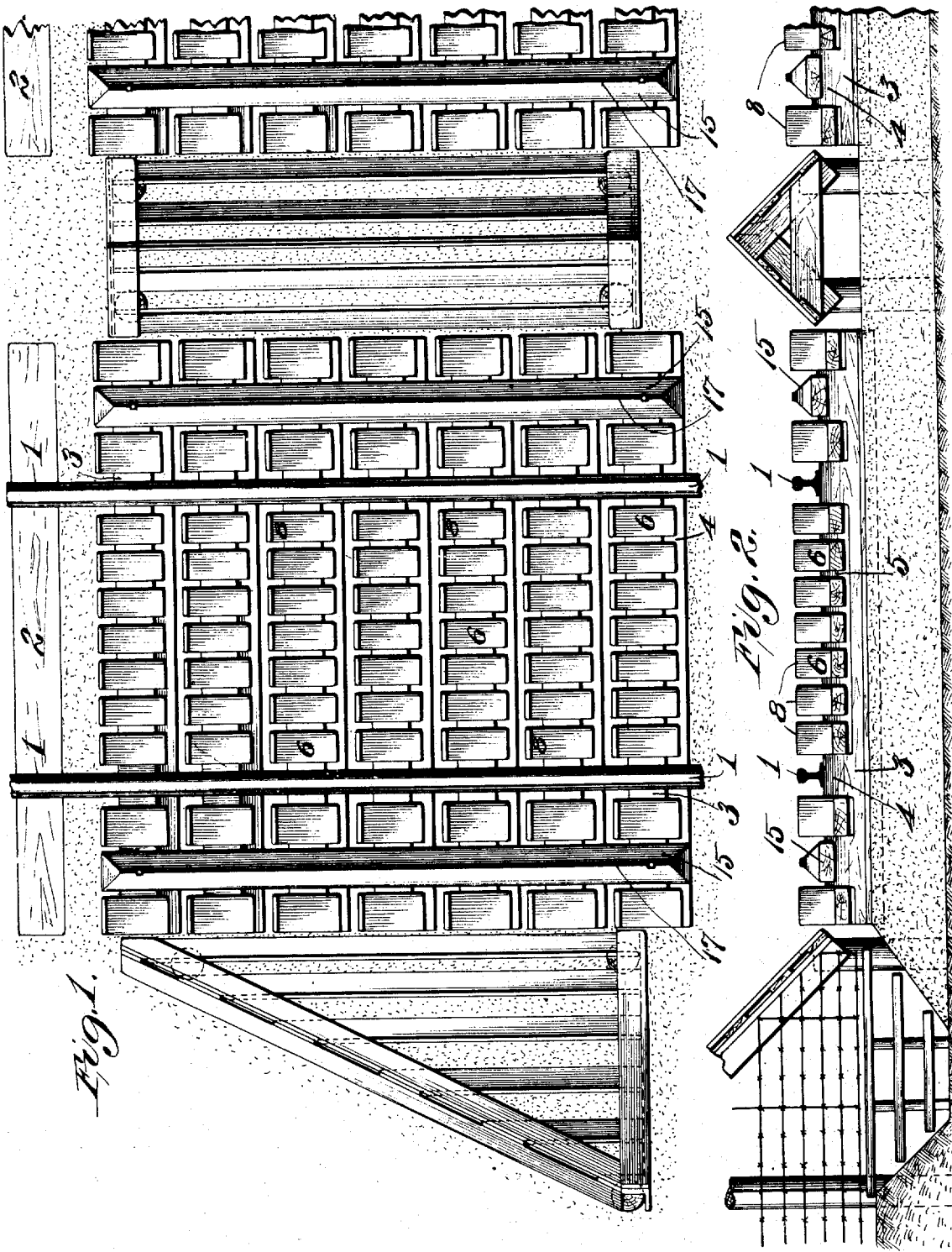

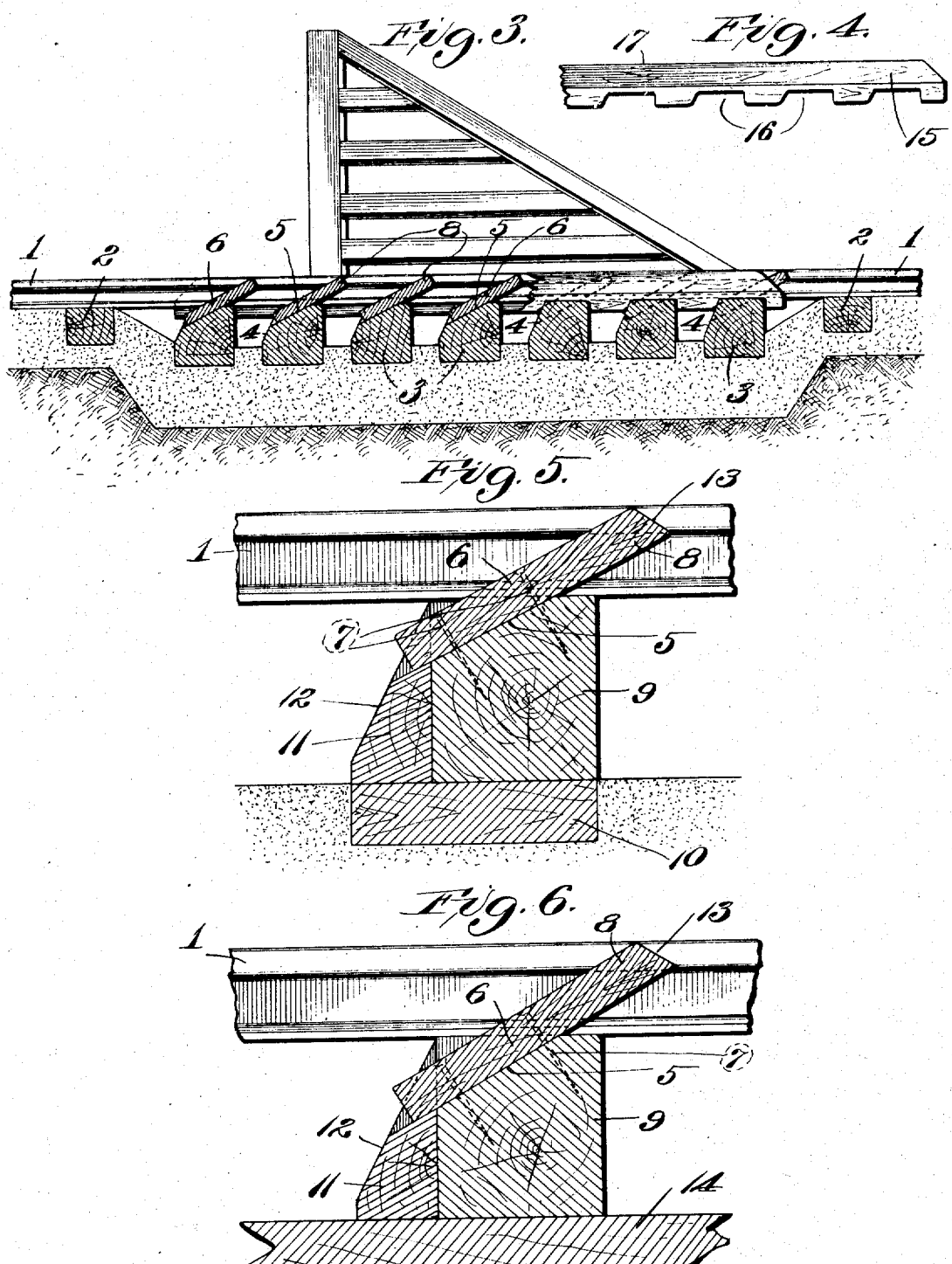

EDWARD J. PEARSON, OF ST. LOUIS, MISSOURI.

CATTLE-GUARD.

1,149,854.  Specification of Letters Patent.  Patented Aug. 10, 1915.

Application filed May 12, 1913. Serial No. 767,009.

*To all whom it may concern:*

Be it known that I, EDWARD J. PEARSON, a citizen of the United States, residing in the city of St. Louis and State of Missouri, have invented new and useful Improvements in Cattle-Guards, of which the following is a specification.

This invention relates to improvements in that type of cattle guard in which a series of inclined boards are secured to the cross ties between and on either side of the rails whereby to cause the foot of an animal placed on any one of said boards to slide over the same and downward into the space between the cross ties, the discomfort and pain caused by the bending and scraping of the animal's leg inducing it to withdraw its foot so that it will be deterred in this manner from attempting to walk upon the tracks.

In devices of this kind with which I am familiar the inclined boards extend beyond both sides of the cross ties thereby making it possible for the hoof of the animal to be caught between the edges of the two boards and render it impossible for the animal to withdraw its foot. Such result has occurred in actual practice, and the construction alluded to is objectionable for that reason.

It is an object of the present invention to provide a cattle guard which shall retain all of the advantages of the cattle guard of the type alluded to but which shall be free from the disadvantage of the liability to entrap the foot of the animal.

It is a further object of the invention to provide a cattle guard in which an inclined face of the cross tie shall coöperate with inclined boards or metal plates, to deflect the foot of an animal and wedge it against the projecting edge of a board or plate on the adjacent tie whereby to cause such discomfort and pain to the animal as will deter it from attempting to proceed farther along the cattle guard.

A still further object of the invention is to provide an improved guard rail which will coöperate in acting as a deterrent for an animal attempting to pass over the cattle guard, and which will also act to brace the cross ties and maintain them in their proper spaced relation.

Other and further objects of the invention relate to details of construction and to combinations and operations of parts, all as hereinafter described and set forth in the claims.

In the accompanying drawings—Figure 1 is a plan view of a cattle guard constructed according to my invention; Fig. 2 is a cross sectional view thereof taken on a line at right angles to the rails; Fig. 3 is a central longitudinal sectional view, a portion of one of the guard rails being shown in elevation; Fig. 4 is a broken view in elevation showing a portion of one of the guard rails; Fig. 5 is a cross sectional view on an enlarged scale through a cross tie illustrating a modification; and Fig. 6 is a similar view illustrating a different manner of supporting the cross tie shown in Fig. 5.

Referring now to the drawings, the numeral 1 indicates the rails, and 2 the usual cross ties embedded in the road bed for supporting said rails. At the place where the cattle guard is located I employ cross ties 3 which are of greater depth than the cross ties 2, as shown, and each of which cross ties is provided on its rear side with an inclined portion 4 extending from near the bottom to the top of said tie. Each of the cross ties 3 is further provided throughout its length with inclined recesses 5 which serve as seats for receiving the boards 6 which are secured to the cross ties in any suitable manner, as by means of spikes 7. Each of the boards 6 has an end-portion 8 which projects forwardly beyond the side of the cross tie.

In practice the cross ties 3 may be of sufficient depth to be embedded in the ballast of the road bed and the inclined portion 4 may be formed by cutting away a portion of the side of the cross tie. This is clearly illustrated in Fig. 3. In certain cases, however, in order to utilize material on hand, or where cross ties of the requisite depth are not readily obtainable, I may employ cross ties 9 of a less thickness and provide a supplemental support 10 extending longitudinally of the cross tie, and which is adapted to be embedded in the road bed. I may also employ a separate block 11 which is secured to the side of the cross tie 9 and provided with an inclined portion 12 corresponding to the incline 4. In this construction the supplemental support 10 will be of sufficiently greater width than the cross tie 9 to support the block 11, as shown in Fig. 5. In either construction the boards 6 are secured in position in the manner previously described. Certain weights of rails are higher than others; and when the height of the rail is such that the upper edge of the projecting portion 8 of the boards 6 extends above the top thereof I cut off the upper portion of said board on an incline, as indicated at 13 in Figs. 5 and 6, so that the extreme upper edge of said board shall not project above the rail. In Fig. 6 the same construction is shown as in Fig. 5, with the exception that the cross tie 9 and block 11 are supported at their ends on timbers 14 extending at right angles to the cross ties instead of longitudinally thereof.

In order to brace the cross ties 3 I employ guard rails 15 provided on their under side with recesses 16 and having an upper sharp edge 17. The recesses 16 are suitably spaced to receive the upper side of the cross ties 3, as clearly shown in Fig. 3, these guard rails being preferably located on either side of the track and between two rows of boards 6, as shown in Fig. 1. These guard rails, as will be understood by those skilled in the art, will serve to keep the cross ties 3 in proper alinement by preventing creeping thereof, and the upper sharp edge 17 will prevent an animal from gaining a foothold thereon.

In operation, if an animal places its foot on one or the other of the boards 6 the incline thereof will cause the foot to slide forward to bring the leg of the animal into contact with the sharp edge of the projecting portion 8 of the board 6 immediately in front of that trod upon. The pain and discomfort thereby caused is usually sufficient to induce the animal to withdraw its foot; but in the event it should not do so and continue pushing its foot downward into the space between two cross ties in the attempt to find a firm foothold, the inclined side 4 of the crosstie, or the inclined side 12 of the block 11, will throw the foot of the animal still farther forward, and any attempt of the animal to progress by moving the other foot forward will be effectually prevented by reason of the great pain that will be caused to the animal by the sharp edge of the projection 8. It will be noted, however, that the boards 6 do not project beyond the forward side of the cross ties, and there is, therefore, nothing to obstruct the free withdrawal of the foot of the animal from between the boards or cross ties.

The inclined members, the cross ties, sills, and other parts, may be constructed of wood, metal, reinforced concrete, or other suitable material, or any combination of different materials, without departing from the spirit of my invention.

I claim:

1. A cattle guard comprising a series of transverse rail supports and a series of boards secured in an inclined position on each of said supports, the forward end of each of said boards projecting beyond the front side of the supports, and each of said supports presenting an incline at its rear side of greater pitch than that of said boards and extending beyond the rear end thereof.

2. A cattle guard comprising a series of cross ties, each of which is supported on an embedded timber, a block having an inclined face secured to the rear side of said cross tie, and a series of boards secured in an inclined position on each of said cross ties, each of said boards projecting beyond the front side of the cross tie and having its opposite end lying inside of a plane bounded by the rear side of said block.

3. A cattle guard comprising a series of cross ties, each of which is supported on an embedded timber extending longitudinally thereof, a block having an inclined face secured to the rear side of said cross tie, and a series of boards secured in an inclined position on each of said cross ties, each of said boards projecting beyond the front side of the cross tie and having its opposite end lying inside of a plane bounded by the rear side of said block.

4. A cattle guard comprising a series of cross ties, each of which is supported on an embedded timber extending longitudinally thereof, a block having an inclined face secured to the rear side of said cross tie, and a series of boards secured in an inclined position on each of said cross ties, said cross ties and blocks being recessed at intervals to form seats for said boards, each of said boards projecting beyond the front side of the cross tie and having its opposite end lying inside of a plane bounded by the rear side of said block.

In testimony whereof, I have hereunto set my hand in presence of two subscribing witnesses.

EDWARD J. PEARSON.

Witnesses:
GEO. W. MARRIOTT,
W. G. ROLLING.